Nov. 17, 1953   J. G. LIEBENOW   2,659,527
PAPER CUP HANDLE
Filed June 16, 1949
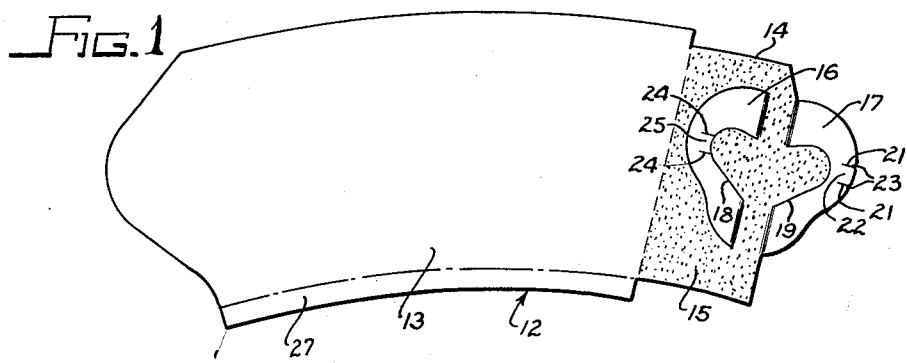
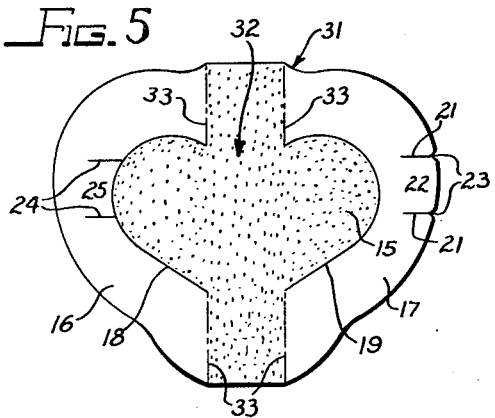
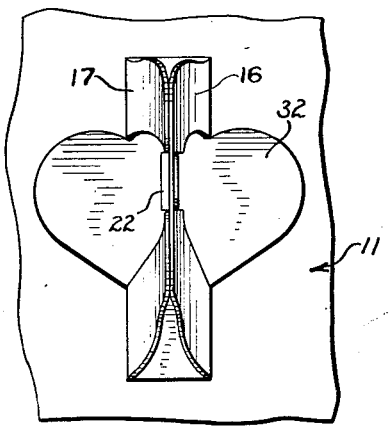
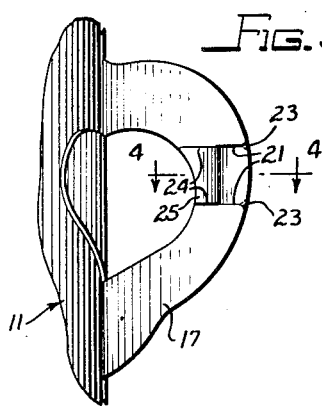
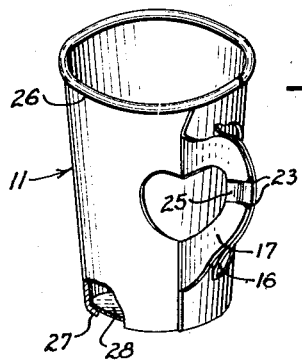
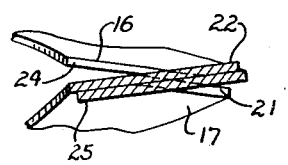
INVENTOR.
Julius Gus Liebenow
BY
atty.

Patented Nov. 17, 1953

2,659,527

UNITED STATES PATENT OFFICE 2,659,527

PAPER CUP HANDLE

Julius Gus Liebenow, Berwyn, Ill.

Application June 16, 1949, Serial No. 99,490

1 Claim. (Cl. 229—52)

The invention relates to improvements in containers and handles therefor, and more particularly to a novel handle structure for paper cups, dishes, or the like.

The invention is particularly concerned with the provision of novelly interlocked handle members of a kind that lie flat against or flush with the container wall when not in position of use so as to permit nesting of the containers and which may be moved outwardly into a converging relationship for use. More particularly, the handle members are integral with or firmly attached to the wall of a tapered cup or other container and are each provided with a suitable tab so arranged as to interengage with the other handle member when the handle members are in their positions of use. Such interengaging means materially increases the rigidity of the handle members and prevents lateral swaying of the attached container because relative sliding of the handle members is prevented.

It is, therefore, an object of the present invention to provide a container with integral handle members embodying means for interlocking one with the other.

Another object is to provide a handle member of a kind which may be readily attached to a cup or like container.

Another object is to provide handle members with novel means for retaining said members in position of use.

Other objects of the invention will appear from the following description and accompanying drawing and will be pointed out in the annexed claim.

In the accompanying drawing there has been disclosed a structure designed to carry out the various objects of the invention, but it is to be understood that the invention is not confined to the exact features shown as various changes may be made within the scope of the claim which follows.

In the drawing:

Fig. 1 is a plan view of the blank for forming the wall of a container embodying features of the invention.

Fig. 2 is a perspective view of a cup formed from the blank shown in Fig. 1, partly broken away.

Fig. 3 is a fragmentry side view of the cup, showing the handle members in side elevation.

Fig. 4 is a sectional view taken on line 4—4 of Fig. 3.

Fig. 5 is a plan view of a blank for a separate handle portion.

Fig. 6 is a front elevational view of the blank shown in Fig. 5, showing the handle members interlocked.

In the embodiment of the invention illustrated in Figs. 1 to 4, inclusive, the container includes a wall 11 which may be formed of an arcuate blank 12 of suitable paper or container stock, the blank having a body portion 13 of uniform width from end to end and terminating at one end in a sealing flap 14 of reduced width.

The sealing flap has an adhesive, indicated at 15, applied to the inner face thereof and is lapped upon and secured to the other end of the blank, thus forming a tapered side wall. The end of the flap is conformed and the flap is slit to provide oppositely disposed U-shaped or loop-like handle members 16 and 17. The flap is slit at 18 and 19 to complete the handle members.

In adhesively securing the flap 14 no adhesive is applied to the inner sides of the handle members so that said handle members may be lifted out from the plane of the flap to provide coacting handle members, as best shown in Fig. 2. When these are grasped to hold the cup, they serve to brace one another to prevent excessive lateral swaying or movement of the cup. It has been found, however, that under certain conditions of use limited lateral swaying movement occurs unless the handle members are firmly gripped to prevent relative sliding. Obviously, such lateral swaying is objectionable particularly when the cup or container is filled with a hot liquid, such as coffee. Accordingly, means is provided in the handle members for interlocking said members in position of use. Such means preferably consists in providing each of the handle members with flaps or tabs arranged to coact with the associated handle member.

Upon referring to Figs. 1 and 3, it will be observed that the handle member 17 has a pair of parallel slits 21 extending inwardly from its outer edge and terminating substantially midway of the width of the said handle member to provide a tab 22. The open ends of the slits 21 preferably are suitably flared, as at 23, for a purpose to become apparent as the description proceeds. The other handle member 16 also is provided with a pair of parallel slits 24 which extend outwardly from the inner edge of said handle member and terminate substantially midway between said edges, as shown, to provide a tab 25.

When the handle members are moved out of the plane of the wall, the respective tabs on said handle members are engaged over the opposed handle member in the manner best illustrated in Fig. 4. Flaring of at least one pair of slits, as shown, facilitates such engagement. Upon referring to said Fig. 4, it will be observed that the tab 25 overlies the outwardly disposed face of the handle member 17 and that the tab 22 overlies the outer face of the handle member 16. This interlocking of the handle members and their respective tabs secures said handle members in the outwardly extending diverging position shown and prevents relative sliding of said handle members and thereby materially increases the utility thereof in preventing lateral or swaying movement of the cup. Also, when the handles are locked together there is no possibility of a user grasping a single handle and upsetting the cup.

In the modified form of cup illustrated in Figs. 5 and 6, the handle members constitute an integral part of a blank 31 which is adhesively secured to the outside surface of the wall of a conventional type of paper cup or other container. As best illustrated in Fig. 5, the blank 31 is conformed and slit at 18 and 19 to provide a substantially flat medial portion 32 and two substantially loop-like handle members 16 and 17. The handle members are hingedly connected to the medial portion 32 as by scored lines 33 and they normally lie substantially in the plane of the medial portion. The medial portion is suitably provided with an adhesive 15 on its back face for adhesively securing it to the wall of the cup or container. Of course, no adhesive is applied to the rear surfaces of the handle members 16 and 17.

The handle members 16 and 17 are provided with tabs 25 and 22, respectively, constructed like the tabs previously described, and like numerals are used to identify corresponding elements thereof.

The cup having the integrally formed handle portions may be manufactured by the same type of machinery and in the same manner as that used in manufacturing cups or other containers without handles, or with handles without interlocking tabs. Similarly, containers having the adhesively attached handle members, such as shown in Fig. 6, may likewise be manufactured by the same type of machinery.

Although exemplary forms of the present invention have been shown in the accompanying drawing and described in the foregoing specification, it should be understood that the invention may embody a variety of modifications in construction, and particularly in the means for detachably securing the handle members in diverging relationship for use, without departing from the spirit of the invention or the scope of the appended claim.

I claim:

In combination with a nestable paper cup or similar article, a handle structure which comprises a pair of symmetrical and opposite curvedly contoured handle element cut-outs hingedly supported along elemental lines of the cup in spaced relationship from each other and substantially parallel, said cut-outs being swingable about their elemental hinge lines from a reposed position lying against the surface of the cup to a utility position generally perpendicular thereto and with extremities in abutting relation to each other, and means for inter-engaging said handle element cut-outs to each other which comprises oppositely incised parallel tabs adapted to be flexed into overlapping contiguous placement and slid into each other's incision spaces and wedged into clamping engagement thereat as their handle element cut-outs are wipingly brought into contour registration each with the other, said cut-outs being bail formations with inner and outer contours and having substantial parallelism at least between portions of their inner and outer contours and the tab incisions being located in the inner contour of one and in the outer contour of the other cut-out at identical planes perpendicular to the elemental hinge lines.

JULIUS GUS LIEBENOW.

References Cited in the file of this patent

UNITED STATES PATENTS

| Number | Name | Date |
|---|---|---|
| 1,902,206 | Wrigley | Mar. 21, 1933 |
| 2,060,781 | Annen | Nov. 17, 1936 |
| 2,171,615 | Wesselman | Sept. 5, 1939 |
| 2,200,813 | Warren | May 14, 1940 |
| 2,378,750 | Carew | June 19, 1945 |
| 2,499,436 | Whitfield | Mar. 7, 1950 |